(12) United States Patent
Hibbs

(10) Patent No.: US 8,809,483 B1
(45) Date of Patent: Aug. 19, 2014

(54) FUNCTIONALIZATION OF POLY(PHENYLENE) BY THE ATTACHMENT OF SIDECHAINS

(71) Applicant: Sandia Corporation, Albuquerque, NM (US)

(72) Inventor: Michael R. Hibbs, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 12 days.

(21) Appl. No.: 13/627,098

(22) Filed: Sep. 26, 2012

(51) Int. Cl.
*C08G 61/02* (2006.01)

(52) U.S. Cl.
USPC ............................. 528/86; 528/373; 521/27

(58) Field of Classification Search
USPC ...................... 528/86, 373; 521/27
See application file for complete search history.

(56) References Cited

U.S. PATENT DOCUMENTS

| 7,301,002 | B1 | 11/2007 | Cornelius et al. |
|---|---|---|---|
| 7,816,482 | B1 | 10/2010 | Hibbs et al. |
| 7,888,397 | B1 | 2/2011 | Hibbs et al. |
| 8,110,636 | B1 | 2/2012 | Fujimoto et al. |

OTHER PUBLICATIONS

Bauer, B., et al., "Anion-exchange membranes with improved alkaline stability," Desalination (1990) 79, 125-144.
Fujimoto, C. H., et al., "Ionomeric poly(phenylene) prepared by Diels-Alder polymerization: synthesis and physical properties of a novel polyelectrolyte," Macromolecules (2005), 38(12), pp. 5010-5016.
Hibbs, M. R., et al., "Synthesis and characterization of poly(phenylene)-based anion exchange membranes for alkaline fuel cells," Macromolecules (2009) 42(21), pp. 8316-8321.
Tanaka, M., et al., "Anion conductive block poly(arylene ether)s: synthesis, properties, and application in alkaline fuel cells, J. Am Chem. Soc.," (2011) 133(27):10646-54.
Varcoe, J. R., et al., "Prospects for alkaline anion-exchange membranes in low temperature fuel cells," (2005) 5(2), pp. 187-200.
Wang, J., et al., "Synthesis of soluble poly(arylene ether sulfone) ionomers with pendant quaternary ammonium groups for anion exchange membranes," Macromolecules (2009) 42(22), pp. 8711-8717.

*Primary Examiner* — Shane Fang
(74) *Attorney, Agent, or Firm* — Blakely Sokoloff Taylor & Zafman LLP; W. Thomas Babbitt

(57) ABSTRACT

A composition and an anion exchange membranes including a composition and a method of forming a composition including a compound including a poly(phenylene) backbone represented by the following formula:

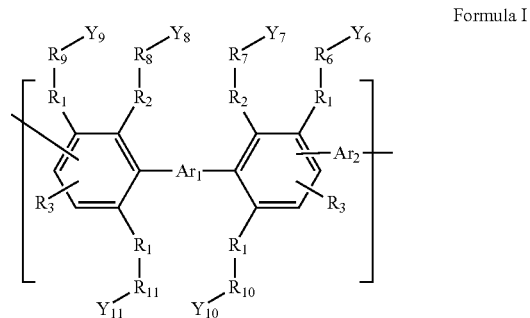

wherein each of $R_1$, $R_2$ and $R_3$ may be the same or different and is H or an unsubstituted or inertly-substituted aromatic moiety; wherein each of $Ar_1$ and $Ar_2$ may be the same or different and is an unsubstituted or inertly-substituted aromatic moiety; wherein each of $R_6$, $R_7$, $R_8$, $R_9$, $R_{10}$ and $R_{11}$ is H or a monovalent hydrocarbon group including two to 18 carbon atoms, with the proviso that each $R_6$, $R_7$, $R_8$, $R_9$, $R_{10}$ and $R_{11}$ cannot be H; and wherein each of $Y_6$, $Y_7$, $Y_8$, $Y_9$, $Y_{10}$ and $Y_{11}$ may be the same or different and is H or a functional group.

8 Claims, 3 Drawing Sheets

FUNCTIONALIZATION OF POLY(PHENYLENE) BY THE ATTACHMENT OF SIDECHAINS

STATEMENT OF GOVERNMENT RIGHTS

This invention was developed under Contract DE-AC04-94AL85000 between Sandia Corporation and the U.S. Department of Energy. The U.S. Government has certain rights in this invention.

FIELD

Poly(phenylene) polymers.

BACKGROUND

Recently, there has been increased interest in the development of anion exchange membrane fuel cells (AEMFCs). The fundamental difference between AEMFCs and the more widely studied proton exchange membrane fuel cells is that the former operate at high pH thus requiring the membrane to conduct hydroxide ions from the cathode to the anode. The key advantage of operating a fuel cell under alkaline conditions is the potential to forgo noble metal catalysts due to the low overpotentials associated with many electrochemical reactions at high pH. The improved electrokinetics also allow for the possible use of high energy density fuels such as ethanol which is also a renewable resource as it can be produced directly by fermentation of biomass. A major challenge in the development of AEMFCs is the need for an anion exchange membrane (AEM) that is chemically stable under the conditions within an AEMFC.

AEMs are typically made with polymers that have pendant cationic groups. By far the most commonly reported cationic group is the benzyl trimethylammonium (BTMA) cation. AEMs have been prepared with BTMA cations attached to polymer backbones such as poly(phenylene), poly(tetrafluoroethene-co-hexafluoropropylene), poly(phenylene oxide), poly(ether-imide), poly(arylene ether sulfone), and poly (ether ether ketone).

Many of these BTMA-containing membranes are reported to have good chemical stability. For example, the ion exchange capacity of a radiation-grafted perfluorinated AEM with BTMA cations was shown to decrease by less than 5% after a 233-hour fuel cell test at 50° C. Another study of the degradation mechanisms of tetraalkylammonium compounds concluded that maintaining hydration around the cations is critical to stability and that, under the correct conditions, such cations possess reasonable stability at temperatures above 60° C. Despite reports such as this, BTMA cations are generally considered to have insufficient stability for long-term use in AEMFCs. Thus the investigation of cationic groups with improved chemical stability is of paramount importance to the development of AEMFCs.

One relatively early study of cation stabilities found that quaternized 4,4'-diazobicyclo-[2.2.2]-octane cations had improved stability to alkaline conditions when compared to BTMA cations. Another approach to preparing more stable cations is to reduce susceptibility to nucleophilic attack by using resonance-stabilized cations such as guanidinium or imidazolium groups. Other reports have included the use of coordinated metal cations or phosphonium cations with bulky electron-donating substituents to both sterically protect the ion from nucleophilic attack and to lessen the charge density on the phosphorous atom. Additionally, it has been reported that attachment of quaternary ammonium groups to the polymer backbone via an alkylene spacer of >3 carbon atoms can lead to improved chemical stability. Attachment of imidazolium and guanidinium groups with alkylene spacers have also been reported.

We have previously described the preparation of AEMs with BTMA cations on a poly(phenylene) backbone that is very stable under alkaline conditions and in AEMFC testing.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
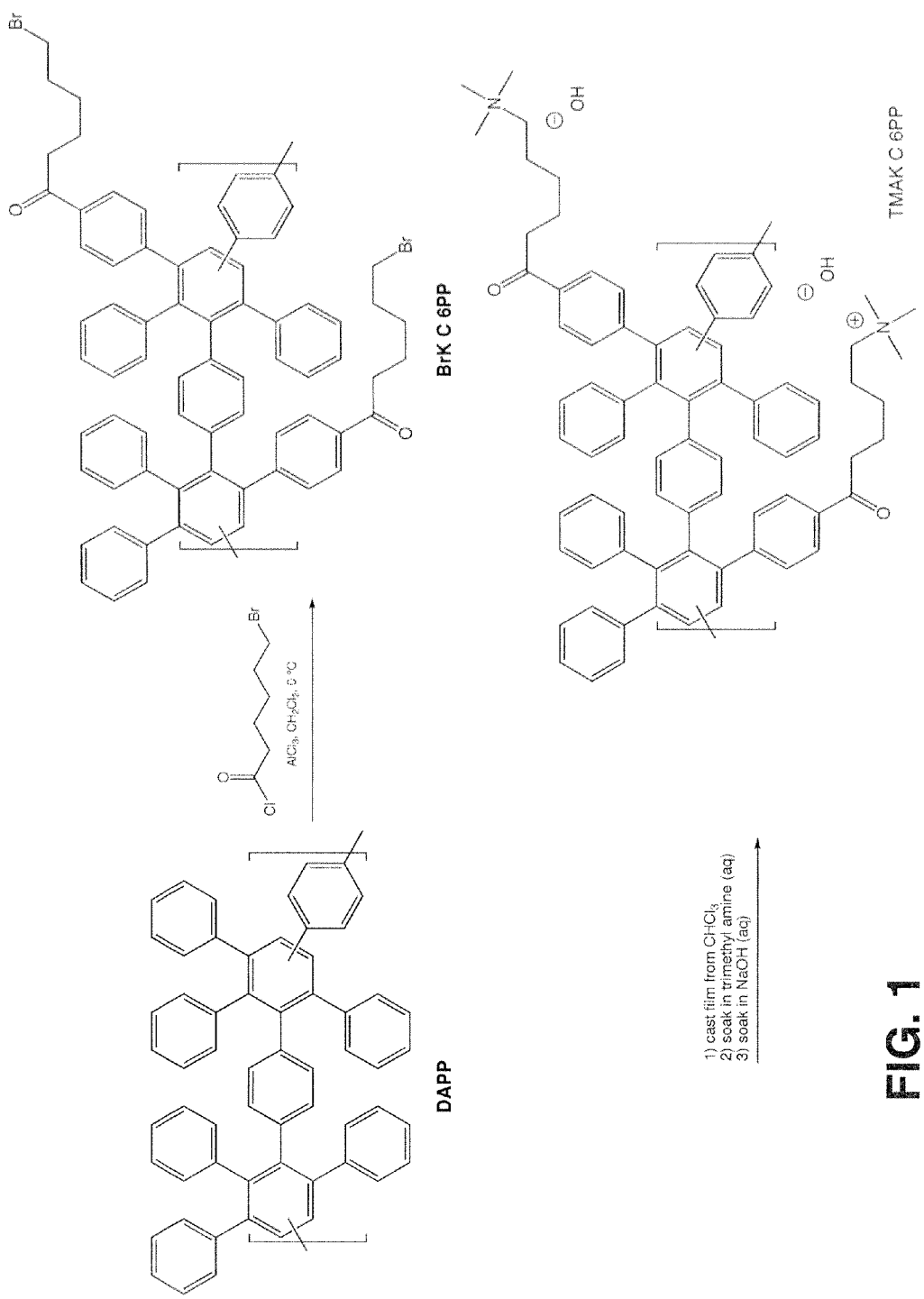
FIG. 1 shows an embodiment of a reaction sequence for attaching acyl side chains and functional groups to DAPP.

According to one embodiment, a composition is disclosed. The composition includes a compound including a poly(phenylene) backbone including a plurality of phenyl(aryl) rings, wherein at least one of the phenyl rings includes a side chain including a monovalent hydrocarbon group of two to 18 carbon atoms and a functional group.

A suitable compound including a poly(phenylene) backbone is illustrated in Formula I. Repeat units of Formula I may be polymerized to form polyphenylene polymers of between about 25 to 200 repeat units. Formula I is synthesized by various methods including Diets Alder reactions for example where bis-tetraphenylcyclopetadienone reacts with p-Bis (ethynyl)benzene to yield carbon monoxide and polyphenylene. Alternatively, polyphenylene and carbon dioxide are produced by the condensation of 2-pyrone with p-Bis(ethynyl)benzene. For ease of explanation, a polyphenylene polymer will be referred to herein as DAPP referencing the Diels-Alder method of synthesis. The compositions described herein may also be referred to as a substituted DAPP.

The repeat unit contains $R_1$, $R_2$ and $R_3$ of Formula I may be the same or different, wherein each $R_1$, $R_2$ and $R_3$ is H or an unsubstituted or inertly-substituted aromatic moiety with the proviso that each of $R_1$, $R_2$ and $R_3$ cannot be H. $Ar_1$ represents an unsubstituted or inertly substituted aromatic moiety; $Ar_2$ represents an unsubstituted or inertly substituted aromatic moiety that may be the same or different from $Ar_1$.

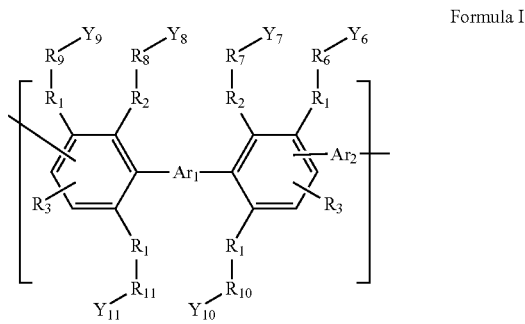

Formula I

Aromatic moieties include phenyl polyaromatic and fused aromatic moieties that can be unsubstituted or inertly-substituted and include:

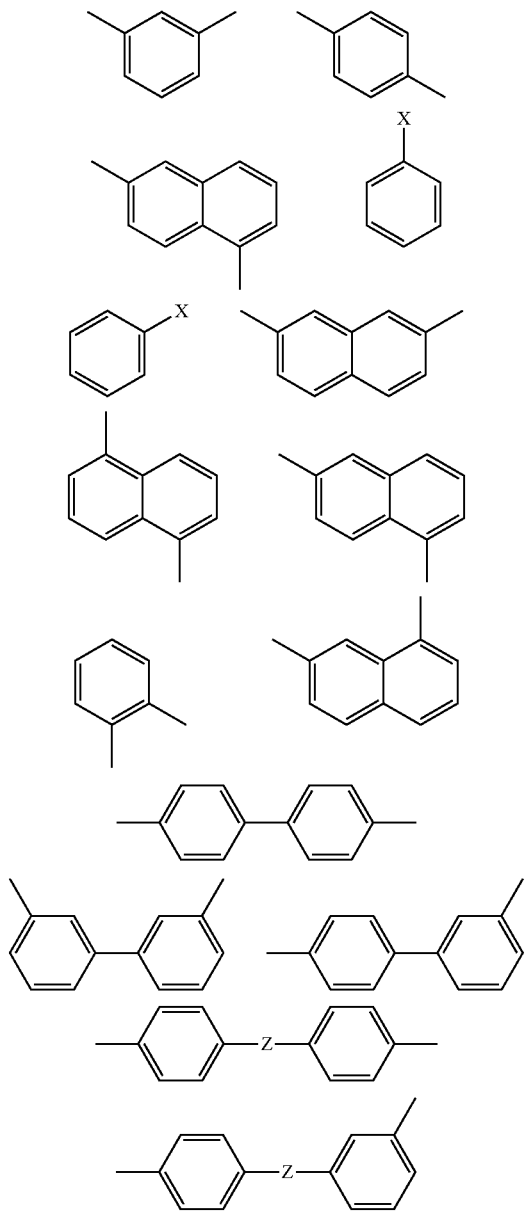

where each Z is selected from —O—, —S—, alkylene, —CF$_2$—, —CH$_2$—, —O—CF$_2$—, perfluoroalkyl, perfluoroalkoxy,

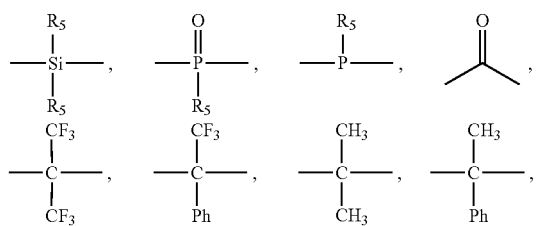

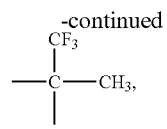

where $R_5$ may be —H, CH$_3$, —CH$_2$CH$_3$, —(CH$_2$)CH$_3$ or Ph, (where Ph is phenyl). Substituent groups that do not react under Diels Alder polymerization conditions and under casting film conditions define inert substituents. Functional groups include but are not restricted to x=CH$_3$, CEt$_3$, CMe$_3$, CF$_3$, NMe$_2$, NH$_2$, F, Cl, Br, OCH$_3$, OH, OCF$_3$, O-Ph, Ph, and SO$_3$R$_5$.

For example, synthesis of DAPPs are performed using a modification of the method known in the art wherein to bis-tetracyclone (50.0 g; 72.4 mmol) and 1,4-diethynylbenzene (9.13 g; 72.4 mmol) in a 500 mL Schlenk flask, diphenyl ether (250 mL) is added and the resulting mixture is frozen in an ice bath. The mixture is freeze-thaw degassed (3.times.) before heating under argon (1 atm) at 180° C. for 24 h. Periodically, carbon monoxide is vented to avoid over-pressurization of the reaction flask. Subsequently, additional diethynylbenzene (0.10 g; 0.8 mmol) is added to the viscous slurry and the mixture is stirred for an additional 12 h at 180° C. The reaction vessel is then cooled to room temperature and its contents are diluted with toluene (300 mL). The polymer is precipitated by dropwise addition of the solution to 1000 mL of acetone. This dilution in toluene and precipitation in acetone is repeated and the resultant white solid is dried in a vacuum oven for 12 h at 80° C., 48 h at 230° C., and 24 h at room temperature. A 96% yield (52 g collected) of a tough, yellow solid is obtained. According to one embodiment of the present invention, the DAPP polymer is polymerized in the absence of a metal catalyst.

In one embodiment, the DAPP backbone has the structure of Formula II with six pendant phenyl groups per repeat unit and a mix of meta and para configurations imparted by the selectivity of a Diels-Alder polymerization. The pendant phenyl groups provides for the introduction of up to six side chains, indicated as $R_6$-$R_{11}$.

Formula II

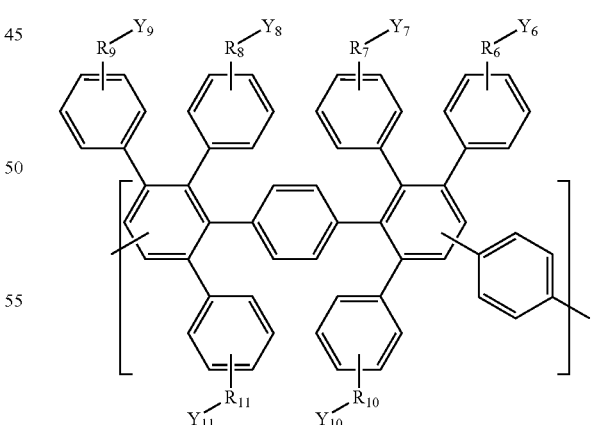

With reference to Formula I and Formula II, in one embodiment, each of $R_6$-$R_{11}$ is a hydrogen (H) or a monovalent hydrocarbon group including two to 18 carbon atoms that may be the same or different with the proviso that each of $R_6$-$R_{11}$ cannot be H. A monovalent hydrocarbon group may have a straight chain or a branched chain structure and may be saturated or unsaturated. Unsaturated monovalent hydrocarbon groups have one or more double bonds, one or more triple bonds, or combinations thereof. A monovalent hydrocarbon group may be substituted with one or more hydroxyl groups (—OH), oxo groups (=O), and substituted or unsubstituted amine groups. A straight or branched chain of a monovalent hydrocarbon group may also be interrupted by O, N, or S atoms.

With reference to Formula I and Formula II, one or more side chains $R_6$-$R_{11}$ can include a functional group, indicated as $Y_6$-$Y_{11}$ that may each be the same or different. A functional group $Y_6$-$Y_{11}$ may be attached as a pendant group anywhere in a chain of a monovalent hydrocarbon group. In one embodiment, a functional group $Y_6$-$Y_{11}$ is attached at the end of the chain. A functional group is selected to impart a desired property to a DAPP polymer, including rendering a functional group susceptible to substitution with another functional group. One example of a functional group is a functional group that is a cationic group. As noted above, polymers including pendant cationic groups have found use in anion exchange membranes. An example of a cationic group is an ammonium, phosphonium, sulfonium, or a nitrogen-containing resonance stabilized cation group, including but not limited to imidazolium, pyridinium and guanidinium. An example of a functional group that is susceptible to substitution with another functional group is a halogen group (e.g., chlorine, bromine). Such a halogen group is susceptible to substitution by a nitrogen-containing base, such as an amine. In a further embodiment, the side chain itself may serve as the functional group. In such an embodiment, the functional group $Y_6$-$Y_{11}$ would be a hydrogen atom (H).

FIG. 1 shows an embodiment of a scheme for attachment of side chains to a DAPP. In one embodiment, the side chains are attached using a Friedel-Crafts acylation reaction. Since none of the pendant phenyl rings in the DAPP is deactivated, the acylation could take place on any of the phenyl rings. The peripheral phenyl rings are the most accessible and therefore the most likely points of attachment. Referring to FIG. 1, in this embodiment, a side chain of a monovalent hydrocarbon group including six carbon atoms including an acyl group and initially having a halogen functional group (bromine) at the end of the chain is attached to two different pendant phenyl rings of the DAPP molecule. According to a Friedel-Crafts acylation process, the attachment is carried out by reacting an acyl chloride (6-bromohexanoyl chloride) with the DAPP resulting in the structure identified as BrKC6PP. Although only two side chains are illustrated attached to the DAPP, it is appreciated that the number of side chains is controlled by the amount of acylating reagent used so polymers with varying degrees of functionalization can be prepared. Also, only one acylation reaction can occur per ring because the resulting attached acyl group (ketone) deactivates the ring.

Following the formation of BrKC6PP, the halogen functional group is substituted with a nitrogen-containing base. FIG. 1 shows a DAPP including a functional group that is an ammonium group identified as TMAKC6PP.

Details of a process for forming BrKC6PP and TMAKC6PP are presented in Example 1.

EXAMPLE 1

Synthesis of BrKC6PP. DAPP (1.73 g, 2.28 mmol) was dissolved in dichloromethane (110 mL) in a flask under argon. The flask was chilled in an ice/water bath and 6-bromohexanoyl chloride (0.80 mL, 5.35 mmoles) was added. Aluminum chloride was added to the flask, the bath was removed, and the reaction was allowed to warm to room temperature over 5 hours while stirring. The solution was poured into a beaker containing 200 mL deionized water and the beaker was heated to 60° C. to evaporate the organic solvent. After cooling to room temperature the mixture was filtered and the solid was blended with acetone in a Waring blender. The mixture was filtered and the solid was dried at room temperature under vacuum to yield DAPP with a bromohexonyl side chain/functional group identified as BrKC6PP as an off-white solid (2.28 g, 85%).

Synthesis of TMAKC6PP. A solution of BrKC6PP (440 mg) in chloroform (10 mL) was filtered through a syringe filter into a circular glass dish with a 3.75 inch diameter. An inverted beaker was placed over the dish and the solvent was allowed to evaporate over 18 h. The resulting film was removed from the dish and immersed in a trimethylamine solution (50 wt % in water) for 48 hours. The resulting membrane was then immersed in 0.5 M HBr for 2 hours and then in deionized water for at least 24 hours to yield DAPP with a trimethyllaminohexanoyl side chain/functional group identified as TMAKC6PP in its bromide counterion form.

Figure 2:
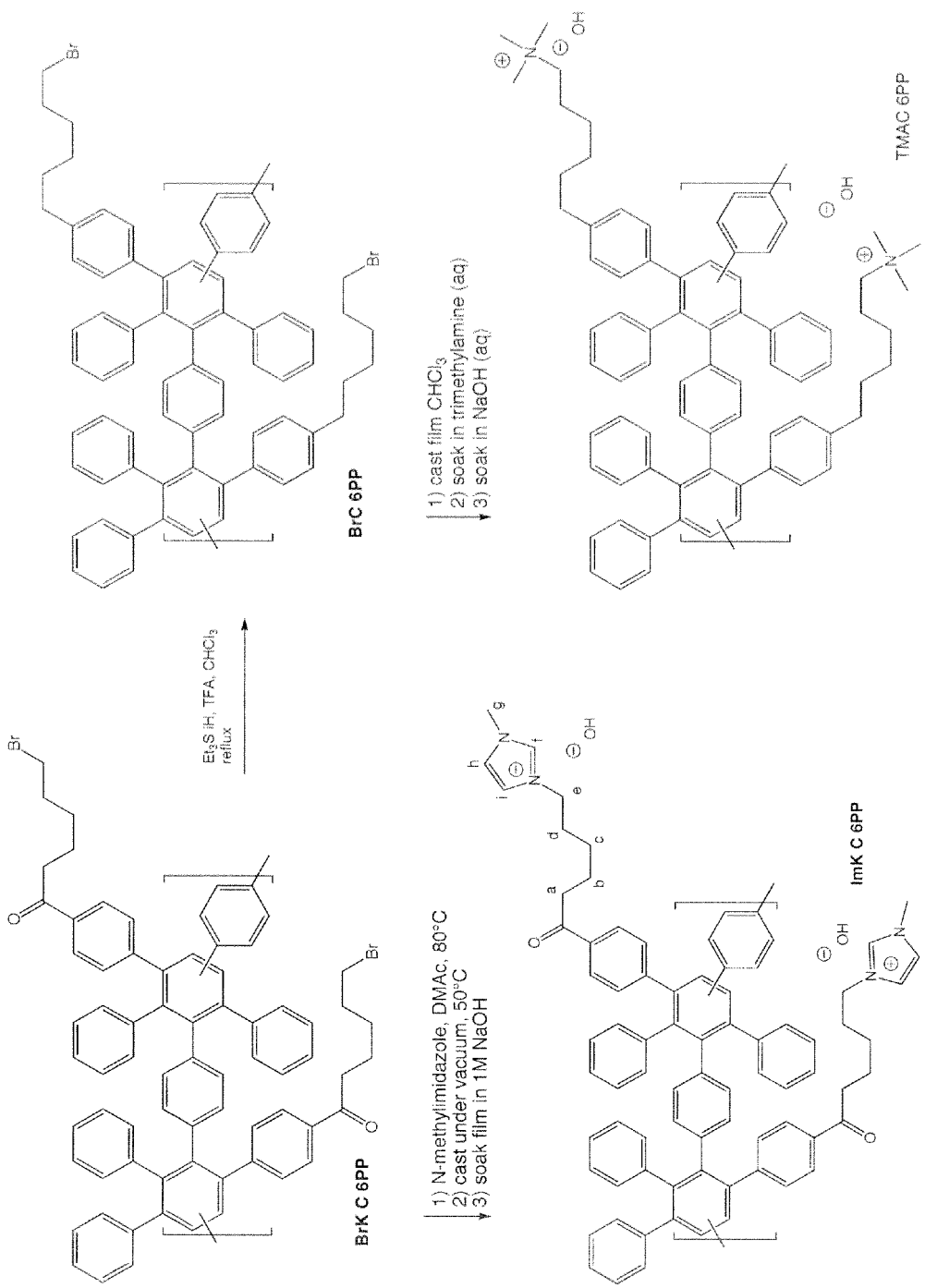
FIG. 2 shows an embodiment of a reaction sequence for attaching alky side chains and functional groups for DAPP.

FIG. 2 shows the synthetic schemes for two other compositions based on the flexible sidechain chemistry. In one case, N-methylimidazole is used instead of trimethyl amine to make a polymer with tethered imidazolium groups, identified as ImKC6PP. This is relevant because several groups have recently reported making AEMs with imidazolium cations and some claim that the imidazolium cations are more stable in alkaline conditions than BTMA cations. The second polymer in FIG. 2 is prepared in two steps. The first step is a reduction of the ketones or acylated side chains in BrKC6PP to form DAPP with alkyl side chains, identified as BrC6PP. The second step is a substitution of the bromine atom with trimethylamine to form alkyl trimethylammonium groups. The resulting polymer, identified as TMAC6PP, is similar to TMAKC6PP except that the ketone has been reduced.

Details of a process for forming ImKC6PP are presented in Example 2. Details of a process for forming BrC6PP and TMAC6PP are presented in Example 3.

EXAMPLE 2

Synthesis of ImKC6PP. BrKC6PP with a degree of functionality of 2.72 (440 mg, ~0.36 mmol) was dissolved in N,N-dimethylacetamide (10 mL) in a flask under argon. N-methylimidazole (0.30 mL, 3.76 mmol) was added and the flask was warmed to 80° C. for 30 minutes. After cooling to room temperature, the solution was filtered through a syringe filter into a circular glass dish with a 3.75 inch diameter. The dish was placed in a vacuum oven which was heated to 50° C. for 18 hours to cast the membrane. The resulting membrane was then immersed in 0.5 M HBr for 2 hours and then in deionized water for at least 24 hours to yield the ImKC6PP membrane in its bromide counterion form.

EXAMPLE 3

Synthesis of BrC6PP. To a solution of BrKC6PP (1.50 g, 1.16 mmol)) in chloroform (40 mL) was added trifluoroacetic acid (20 mL) and triethylsilane (1.90 mL, 11.91 mmol). The solution was heated to reflux for 24 hours, then cooled to room temperature and poured into a beaker containing NaOH (9.6 g) dissolved in water (300 mL). The beaker was heated to 60° C. to evaporate the organic solvent. After cooling to room temperature the mixture was filtered and the solid was blended with acetone in a Waring blender. The mixture was filtered and the solid was dried at room temperature under vacuum. Analysis of this product indicated incomplete reduction of the ketone, so the solid was dissolved again in chloroform (40 mL) and trifluoroacetic acid (20 mL) and triethylsilane (1.90 mL, 11.91 mmol) were added. The solution was heated to reflux for 24 hours, then cooled to room temperature and poured into a beaker containing NaOH (9.6 g) dissolved in water (300 mL). The beaker was heated to 60° C. to evaporate the organic solvent. After cooling to room temperature the mixture was filtered and the solid was blended with acetone in a Waring blender. The mixture was filtered and the solid was dried at room temperature under vacuum to yield BrC6PP as a white solid (1.30 g, 89%).

Synthesis of TMAC6PP. A solution of BrC6PP (1.20 g) in chloroform (30 mL) was filtered through a syringe filter into a square glass dish with 5-inch edges. An inverted beaker was placed over the dish and the solvent was allowed to evaporate over 18 h. The resulting film was removed from the dish and immersed in a trimethylamine solution (50 wt % in water) for 48 hours. The resulting membrane was then immersed in 0.5 M HBr for 2 hours and then in deionized water for at least 24 hours to yield the TMAC6PP composition in its bromide counterion form.

In another embodiment, an apparatus is disclosed. The apparatus includes an anion exchange membrane including a polymer including a poly(phenylene) backbone including a plurality of phenyl(aryl) rings, wherein at least one of the phenyl rings includes a side chain including a monovalent hydrocarbon group of two to 18 carbon atoms and a functional group. A suitable polymer is substituted DAPP described above, including but not limited to TMAKC6PP, ImKC6PP and TMAC6PP. Such polymers offer the placement of cations at the ends of flexible side chains (e.g., six carbon chains) that allows the cations to aggregate and form ion-conducting channels. The addition of flexible side chains also provides elasticity to a membrane. Finally, the chemical stability of the substituted DAPP polymer membranes offers at least similar chemical stability to previously reported BTMA cation polymers.

Figure 3:
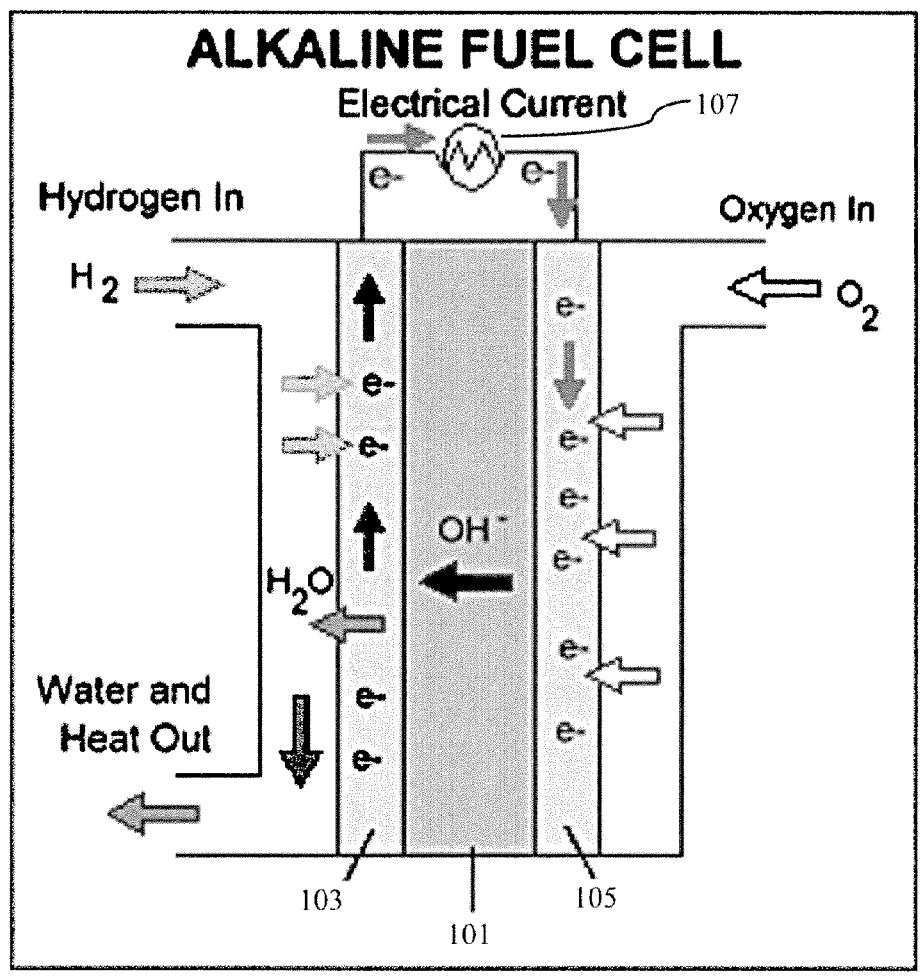
FIG. 3 illustrates a side view of an embodiment of a membrane electrode assembly.

Referring now to FIG. 3, a membrane electrode assembly according to one embodiment is illustrated. In this embodiment, membrane 101 is positioned between anode 103 and cathode 105 where, for example, the membrane is composed of a polymer as described above (e.g., a substituted DAPP) and the anode and/or the cathode may contain some of a polymer as described above (e.g., a substituted DAPP). At the cathode, oxygen molecules are reduced and combine with water, forming hydroxide ions. This process is made possible by the catalyst at the cathode, for example, Platinum or Ruthenium-Platinum. Polymer electrolyte membrane 101 allows hydroxide ions to flow through but not electrons. As a result, the hydroxide ions flow directly through the polymer electrolyte membrane to the anode where the fuel is oxidized and electrons are released. This process is made possible by the catalyst at the anode, for example, Platinum or Ruthenium-Platinum. The electrons produce electrical current as they flow through external circuit 107 to cathode 105. This current can perform useful work by powering any electrical device. In one embodiment, a polymer electrolyte membrane of FIG. 3 may be formed by representatively casting a substituted DAPP polymer on a clean glass surface which may be coated with hydrophobic groups to produce a film.

While an anion exchange membrane is one application for a substituted DAPP, it is appreciated that substituted DAPP as described above can be used in other applications and the functionality of the polymer modified for uses in various applications through the functional groups pendant to the backbone. One example of polymer modification is the preparation of block copolymers wherein the side chains are attached only to certain blocks (e.g., DAPP blocks in a copolymer).

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated in the figure to indicate corresponding or analogous elements, which may optionally have similar characteristics.

It should also be appreciated that reference throughout this specification to "one embodiment", "an embodiment", "one or more embodiments", or "different embodiments", for example, means that a particular feature may be included in the practice of the invention. Similarly, it should be appreciated that in the description, various features are sometimes grouped together in a single embodiment, figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

The invention claimed is:
1. A composition comprising:
   a compound comprising a poly(phenylene) backbone represented by the following formula:

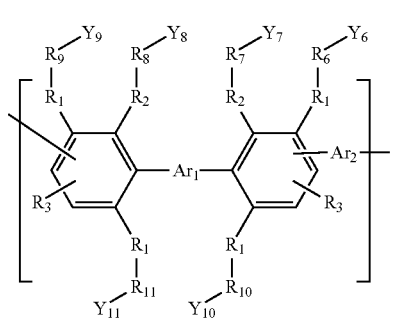

Formula I wherein each of $R_1$, $R_2$ and $R_3$ may be the same or different and is H or an unsubstituted or inertly-substituted aromatic moiety;

wherein each of $Ar_1$ and $Ar_2$ may be the same or different and is an unsubstituted or inertly-substituted aromatic moiety;

wherein each of $R_6$, $R_7$, $R_8$, $R_9$, $R_{10}$ and $R_{11}$ is H or a monovalent hydrocarbon group comprising two to 18 carbon atoms, with the proviso that each $R_6$, $R_7$, $R_8$, $R_9$, $R_{10}$ and $R_{11}$ cannot be H;

wherein each of $Y_6$, $Y_7$, $Y_8$, $Y_9$, $Y_{10}$ and $Y_{11}$ may be the same or different and is H or a functional group; and wherein the monovalent hydrocarbon group comprises an acyl group and the side chain is attached to the at least one of the plurality of rings through the acyl group.

2. The composition of claim 1, wherein the monovalent hydrocarbon group comprises an alkyl group comprising two to 18 carbon atoms.

3. The composition of claim 1, wherein the functional group comprises a nitrogen containing base.

4. The composition of claim 3, wherein the functional group comprises a nitrogen containing resonant stabilized cation group.

5. An apparatus comprising an anion exchange membrane comprising a compound comprising a poly(phenylene) backbone represented by the following formula:

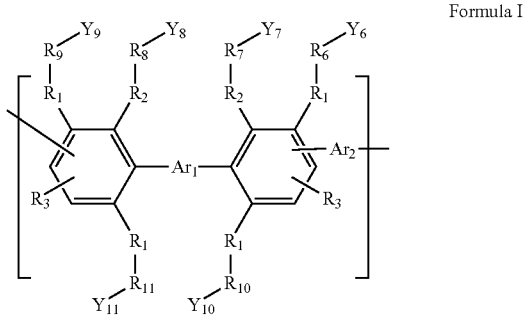

Formula I wherein each of $R_1$, $R_2$ and $R_3$ may be the same or different and is H or an unsubstituted or inertly-substituted aromatic moiety;

wherein each of $Ar_1$ and $Ar_2$ may be the same or different and is an unsubstituted or inertly-substituted aromatic moiety;

wherein each of $R_6$, $R_7$, $R_8$, $R_9$, $R_{10}$ and $R_{11}$ is H or a monovalent hydrocarbon group comprising two to 18 carbon atoms, with the proviso that each $R_6$, $R_7$, $R_8$, $R_9$, $R_{10}$ and $R_{11}$ cannot be H;

wherein each of $Y_6$, $Y_7$, $Y_8$, $Y_9$, $Y_{10}$ and $Y_{11}$ may be the same or different and is H or a functional group; and wherein the monovalent hydrocarbon group comprises an acyl group and the side chain is attached to the at least one of the plurality of rings through the acyl group.

6. The apparatus of claim 5, wherein the monovalent hydrocarbon group comprises an alkyl group comprising two to 18 carbon atoms.

7. The apparatus of claim 5, wherein the functional group comprises a nitrogen containing base.

8. The apparatus of claim 7, wherein the functional group comprises a nitrogen containing resonant stabilized cation group.

* * * * *